(12) United States Patent
Chien et al.

(10) Patent No.: US 7,577,646 B2
(45) Date of Patent: Aug. 18, 2009

(54) METHOD FOR FINDING SEMANTICALLY RELATED SEARCH ENGINE QUERIES

(75) Inventors: Steve Chien, Mountain View, CA (US); Nicole Immorlica, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 11/119,667

(22) Filed: May 2, 2005

(65) Prior Publication Data

US 2006/0248068 A1    Nov. 2, 2006

(51) Int. Cl.
*G06F 7/00*    (2006.01)
*G06F 17/30*   (2006.01)

(52) U.S. Cl. .................. 707/4; 707/6; 707/10; 707/102; 709/218

(58) Field of Classification Search .................. 707/3, 707/4, 6, 10, 100, 102; 709/203, 218
See application file for complete search history.

(56) References Cited

U.S. PATENT DOCUMENTS

| | | | | |
|---|---|---|---|---|
| 4,471,459 A | * | 9/1984 | Dickinson et al. ........... | 715/533 |
| 5,619,709 A | * | 4/1997 | Caid et al. ................... | 715/532 |
| 5,987,446 A | * | 11/1999 | Corey et al. .................... | 707/3 |
| 6,144,958 A | * | 11/2000 | Ortega et al. .................. | 707/5 |
| 6,539,377 B1 | * | 3/2003 | Culliss .......................... | 707/5 |
| 6,564,211 B1 | * | 5/2003 | Andreev et al. ................ | 707/3 |
| 6,571,225 B1 | * | 5/2003 | Oles et al. ...................... | 706/12 |

FOREIGN PATENT DOCUMENTS

TW    227417 B    2/2005

OTHER PUBLICATIONS

International Search Report and Written Opinion dated Jun. 2007 in PCT Application No. PCT/US06/14975.
European Office Action dated Sep. 8, 2008 in European Application No. 06750890.3.

* cited by examiner

*Primary Examiner*—Hosain T Alam
*Assistant Examiner*—Van H Ngo
(74) *Attorney, Agent, or Firm*—Vierra Magen Marcus & DeNiro LLP (57) ABSTRACT

A method for determining semantic correlation between an input query and stored queries based on their temporal correlation. Embodiments include a formal calculation of a correlation coefficient between an input query and stored queries. Alternate embodiments include methods for calculation of a correlation coefficient using a reduced data model and efficient data examination with little or no sacrifice in the accuracy of the correlation coefficient.

14 Claims, 8 Drawing Sheets

|  | 1 | 2 | 3 | 4 | 5 | 6 | ... | δ-1 | δ |
|---|---|---|---|---|---|---|---|---|---|
| $v(\tilde{Y}_q)$ | 0 | 1 | 1 | 1 | 1 | 0 |  | 1 | 0 |
| $v(\tilde{Y}_p)$ | 0 | 1 | 0 | 1 | 1 | 1 |  | 0 | 0 |

METHOD FOR FINDING SEMANTICALLY RELATED SEARCH ENGINE QUERIES

BACKGROUND OF THE INVENTION

1. Field of the Invention

The present invention is directed to methods for finding semantically related search engine queries.

2. Description of the Related Art

Online search engines provide an enormously powerful tool for accessing the vast amount of information available on the Internet in a structured and discriminating scheme. Popular search engines such as MSN®, Google® and Yahoo!® service tens of millions of queries for information every day. A typical search engine operates by a coordinated set of programs including a spider (also referred to as a "crawler" or "bot") that gathers information from web pages on the World Wide Web in order to create entries for a search engine index; an indexing program that creates the index from the web pages that have been read; and a search program that receives a search query, compares it to the entries in the index, and returns results appropriate to the search query.

A current area of significant research in the field of search engine technology is how to improve the efficiency and quality of results for a given search query. So called concept-based searching involves using statistical analysis on various search criteria in order to identify and suggest alternative search queries that are highly semantically related to the input search query. Identifying alternative, highly correlated search queries can help focus and improve the search results for a given search. Moreover, companies and advertisers present advertising when particular queries are entered. It would be extremely beneficial to such companies and advertisers to associate their advertising with particular queries as well as other semantically related queries.

In an example of a prior art system employing concept-based searching, queries are correlated together depending on the degree to which results returned in the respective queries are the same. Thus, if first and second queries return nearly identical search results, these two queries would be considered highly correlated with each other. An example of concept-based searching is set forth in a paper by H. Daume and E. Brill, entitled, "Web Search Intent Induction via Automatic Query Reformulation," published for the *Human Language Technology Conference/North American Chapter of the Association for Computational Linguistics (HTL/NAACL)*, Boston, Mass. (2004).

Another example of concept-based searching examines click-through data as an indicator of related search queries. This model inspects the links that are clicked-on from the results of different search queries. If two different queries lead to users clicking on the same URLs, then these two queries would be considered highly correlated. An example of the click-through concept-based searching is disclosed in a paper by D. Beeferman and A. Berger, entitled, "Agglomerative Clustering of a Search Engine Query Log," published for the *Sixth ACM SIGKDD International Conference on Knowledge Discovery and Data Mining*, Boston, Mass. (2000).

Another promising semantic-based search technology relates to analyzing the input queries themselves to reveal patterns, trends and periodicities over specified time sequences. For example, Vlachos, M., Meek, C., Vagena, Z. and Gunopulos, D. published a paper entitled, "Identifying Similarities, Periodicities and Bursts for Online Search Queries" for the *International Conference on Management of Data (SIGMOD)*, Paris, France (2004) ("Vlachos et al."), which paper is incorporated by reference herein in its entirety. Vlachos et al. note that different events have different temporal search frequencies. For example, the frequency of the query "cinema" has a peak every weekend, while the frequency of the query "Easter" builds to a single peak each spring and then drops abruptly. The theory behind temporal correlation is that if two search queries exhibit sufficiently similar temporal patterns, they are likely to be semantically related. Vlachos et al. use the query logs stored on one or more servers associated with a search engine (MSN® in their study) to build a time series for each actual query, where the elements of the time series are the number of times that query was searched on a given day.

Using Fourier analysis, Vlachos et al. represent the temporal periodicities in a query's rate over time by Fourier coefficients, and then apply time-series matching techniques to identify other queries with very similar temporal patterns. The matching techniques they employ measure temporal similarity based on the Euclidean distance between the Fourier coefficients. Under this framework, they describe an approach to find the most similar queries to a given query using the several best Fourier coefficients for each query.

Figure 1:
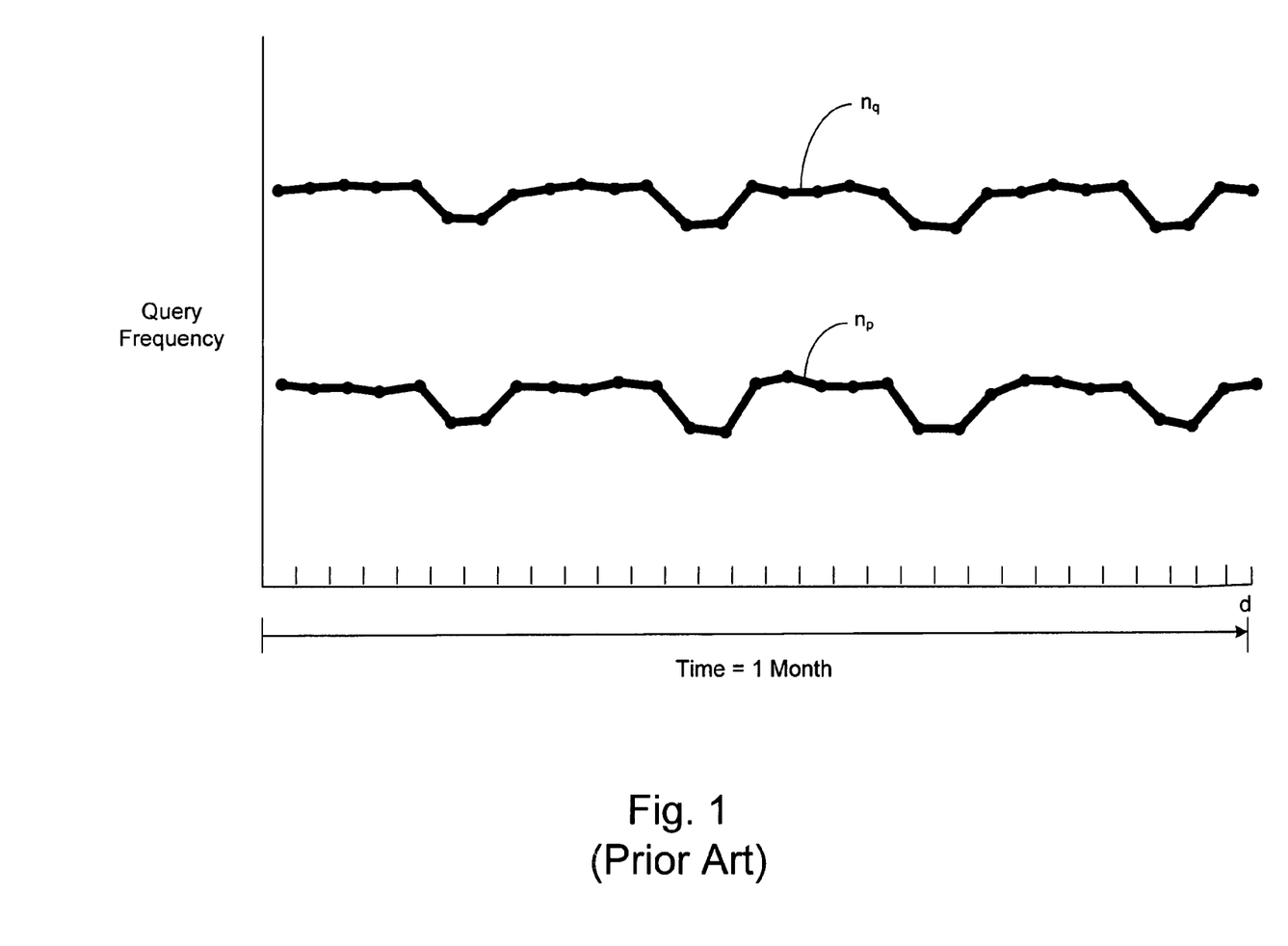
FIG. 1 is a graph of the frequencies of two different queries measured over a month long period in a conventional system for finding semantically related search queries.

The temporal pattern for search engine queries varies over time. For example, the volume of searches is greater during the day than overnight, and the volume of searches is greater during weekdays than on weekends. Models which attempt to identify semantic query matches may have an artificially high correlation between two searches because this natural variance over time is not factored in. For example, FIG. 1 is a sample graph of the number of occurrences of two different search queries measured on a daily basis over a period of a month. The first plot, $n_a$, is the number of occurrences of the first query and the second plot, $n_b$, is the number of occurrences of the second query. As can be seen, both plots show decreased occurrences on the weekends relative to the weekdays. Under typical temporal models for finding semantically related search queries, this sort of parallel decreased weekend activity may lead to an artificially high semantic correlation between the two queries, when in fact, this correlation may instead be due to the natural variation of search queries over time.

SUMMARY OF THE INVENTION

Embodiments of the present invention provide a method for determining semantic correlation between an input query and stored queries based on their temporal correlation. Embodiments include a formal calculation of a correlation coefficient between an input query and stored queries. Alternate embodiments include methods for calculation of a correlation coefficient using a reduced data model and efficient data examination with little or no sacrifice in the accuracy of the correlation coefficient.

The frequency function of a query q over d time units is the d-dimensional vector $Y_q = (Y_{q,1}, \ldots, Y_{q,d})$. The query frequency at each discrete time unit, $Y_{q,i}$, is the normalized frequency of query q during the $i^{th}$ time unit. Using the normalized frequency (i.e., the frequency of the query q in comparison to all other queries received during a given time unit), normalizes out the effects of the natural variation of query stream volume over time.

The formal process stores the normalized query frequency function $Y_{q,i}$ for all time units and for all queries received. Using the mean and the standard deviation of the normalized frequency function for each query, the correlation coefficient between any two queries may be determined. A correlation coefficient over a threshold value for two queries is considered meaningful, and indicates a temporal and semantic correlation between the queries.

Using the formal method for calculation of correlation coefficients, a query stream with n queries and d time units requires storing d frequency values per query for a total of dn normalized frequency function values and also requires a linear pass over all of this data each time it is desired to determine the correlation coefficient for an input query with all stored queries. An alternative embodiment makes use of techniques from the theory of embeddings and nearest neighbor algorithms to allow normalized frequency functions for each query to be represented with less data. Calculation of the correlation coefficient using the reduced data model also provides for accurate estimation of correlation coefficients between an input query and other queries in less processing time, enabling real time computation of correlation coefficients.

The reduced data model represents query frequency functions with reduced data by defining a single query frequency vector $\tilde{Y}_q$ for the normalized frequency function for all stored queries in Euclidian real space of d-dimensions, $\mathbb{R}^d$. Each of the query frequency vectors may be used as inputs to a mapping, $v(\cdot)$: $\mathbb{R}^d \rightarrow \{0, 1\}^\delta$ that represents each query frequency vector $\tilde{Y}_q$ as a string of $\delta$ bits, $v(\tilde{Y}_q)$. The value (1 or 0) for each of the $\delta$ bits in the bit string, or embedding, $v(\tilde{Y}_q)$ is determined using random hyperplanes employing the theory of embeddings. For a particular query q, the $j^{th}$ bit value of the embedding $v(\tilde{Y}_q)$ is dictated by which side of a random hyperplane the vector $\tilde{Y}_q$ lies, where the hyperplane may be represented by a vector $r_j$ orthogonal to the randomly generated hyperplane. The number of hyperplanes generated, $\delta$, is large enough to provide an approximately uniform distribution of the hyperplanes to yield embeddings $v(\tilde{Y}_q)$ accurately representing each query frequency function.

In the reduced data model, the correlation coefficient between an input query q and any stored query p is estimated by the fraction of corresponding bits 1 through $\delta$ between the embeddings $v(\tilde{Y}_q)$ and $v(\tilde{Y}_p)$ that are the same. The greater the number of matching corresponding bits, the higher the correlation coefficient between queries q and p, and the more temporally correlated are the queries.

Once representations of all query frequency functions are generated and stored, the correlation between an input query and all such stored queries may be determined. While it is possible to make a linear pass over all of the stored data, embodiments of the invention employ a scheme for reducing the processing time it takes to find correlated queries. This may be accomplished by limiting the number of queries examined to only those that are likely to have a correlation above the predetermined correlation coefficient threshold.

In such an embodiment, each of the stored queries p is organized into buffer locations, referred to herein as buckets, based on the first k bits of its embedding $v(\tilde{Y}_p)$. Thereafter, upon receiving an input query q, the processing unit examines only those bit strings $v(\tilde{Y}_p)$ in the bucket containing q's bit string, $v(\tilde{Y}_q)$, as well as those buckets having a predetermined number of bits matching the bucket containing q's bit string.

DETAILED DESCRIPTION

Embodiments of the invention will now be described with reference to FIGS. 2-11, which in general relate to methods for finding semantically related search engine queries. The method according to embodiments of the invention is based at least in part on the idea that queries are semantically related if they are temporally correlated. That is, if popularities of different search queries tend to increase and decrease together over time, they are likely semantically related to each other. Embodiments of the present invention therefore identify queries that are temporally correlated with a given search query.

In embodiments, the present invention analyzes the density of a particular query at a particular time rather than the frequency of the query. Density is frequency of a query in comparison to all other queries at that particular time. This approach normalizes out errors introduced by changes in volume caused by natural variations in search engine volume. In addition, the correlation of frequency functions is compared rather than the covariance, to better catch false positives. Furthermore, to make the algorithm practical, an approximation algorithm is used to find approximate correlations rather than actual correlations. The approximately algorithm significantly reduces the storage space necessary, and the processing time required, to find semantically related queries, with little or no sacrifice in accuracy of the correlations.

Figure 2:
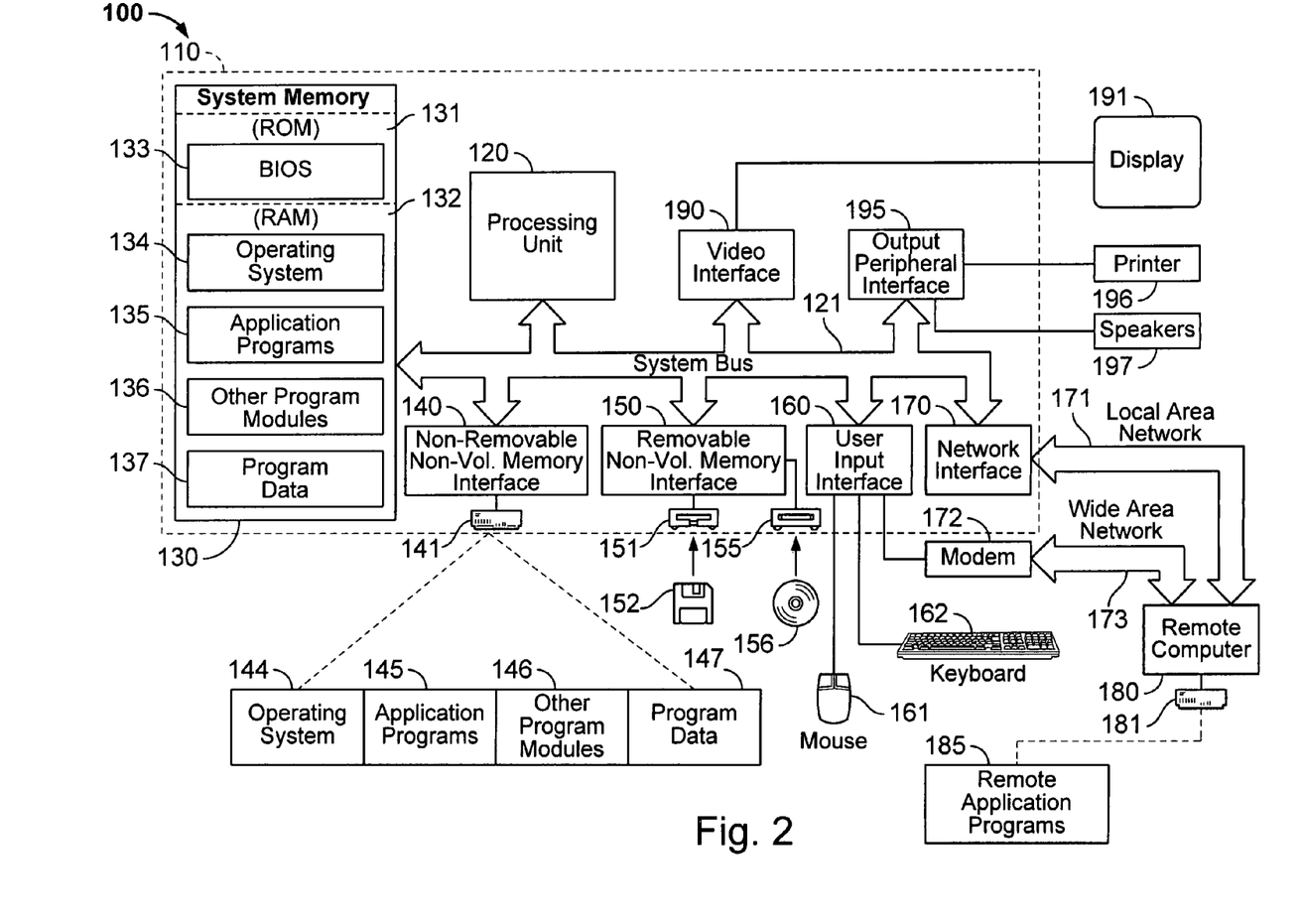
FIG. 2 is a block diagram of computer hardware suitable for implementing embodiments of the invention.

The methods described herein can be performed on a variety of processing systems. FIG. 2 illustrates an example of a suitable general computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency or requirement relating to any one or combination of components illustrated in the exemplary computing system environment 100.

The invention is operational with numerous other general purpose or special purpose computing systems, environments or configurations. Examples of well known computing systems, environments and/or configurations that may be suitable for use with the invention include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
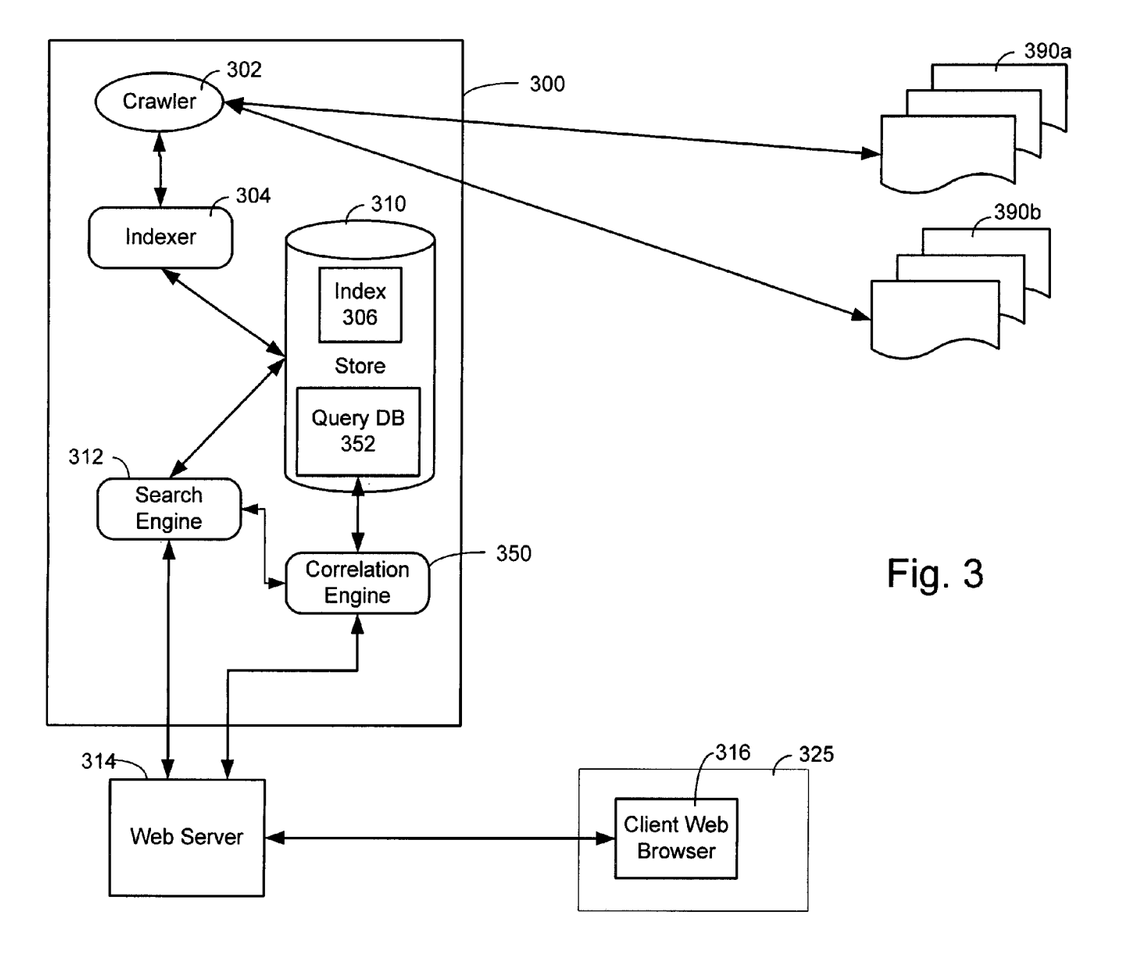
FIG. 3 is block diagram of a search engine including code and data structure that can operate with and/or within the computer hardware shown in FIG. 2.

FIG. 3 is block diagram of a search processing environment 300 including software modules and data structure on which the present invention may be implemented. The search processing environment 300 can operate with and/or as part of the computing system environment 100 described above. Search processing environment 300 may be a crawler-based system having three major elements. First is the spider, also called the crawler 302. The spider visits a web page 390a, 390b, reads it, and then follows links to other pages within the site. The spider returns to the site on a regular basis to look for changes. The basic algorithm executed by any web crawler takes a list of seed URLs as its input and repeatedly: remove a URL from the URL list, determine the IP address of its host name, download the corresponding document, and extract any links contained in it. For each of the extracted links, translate it to an absolute URL (if necessary), and add it to the list of URLs to download, provided it has not been encountered before. If desired, process the downloaded document in other ways (e.g., index its content).

Everything the spider finds goes into the second part of the search engine, the index 306. The index 306, sometimes called the catalog, is a repository containing a copy of every web page that the spider finds. If a web page changes, then this book is updated with new information. The index is stored in a data store 310.

The third part of the search processing environment 300 is search engine 312. This is the program that sifts through the millions of pages recorded in the index to find matches to a search and rank them in order of what it believes is most relevant. Searching through an index involves a user building a query and submitting it through the search engine. The query can be quite simple, a single word at minimum, or may be a series of words or phrases. Building a more complex query is also possible with the use of Boolean operators that allow a user to refine and extend the terms of the search.

In practice, a user of computing device 325 accesses search processing environment 300 via a web browser 316 on the client side and a web server 314 on the host side. Once a communication link is established between client and host, a user of computing device 325 may perform query searches as described above.

In accordance with embodiments of the invention, search processing environment 300 may further include a correlation engine 350. Correlation engine 350 is a software module capable of identifying semantically related queries to a query input by the user of computing device 325, and presenting the semantically related queries to the user in some form as explained hereinafter. The correlation engine communicates with the search engine 312 to receive input queries. The correlation engine also communicates with a query database 352 maintained within data store 310. Query database 352 stores all raw frequency data regarding past queries, as well as normalized query data and other parameters used by the present invention as explained hereinafter. The correlation engine may also communicate with the web server to present identified semantically related search queries to the user of device 325, or aid in the refinement of the search results.

Figure 4:
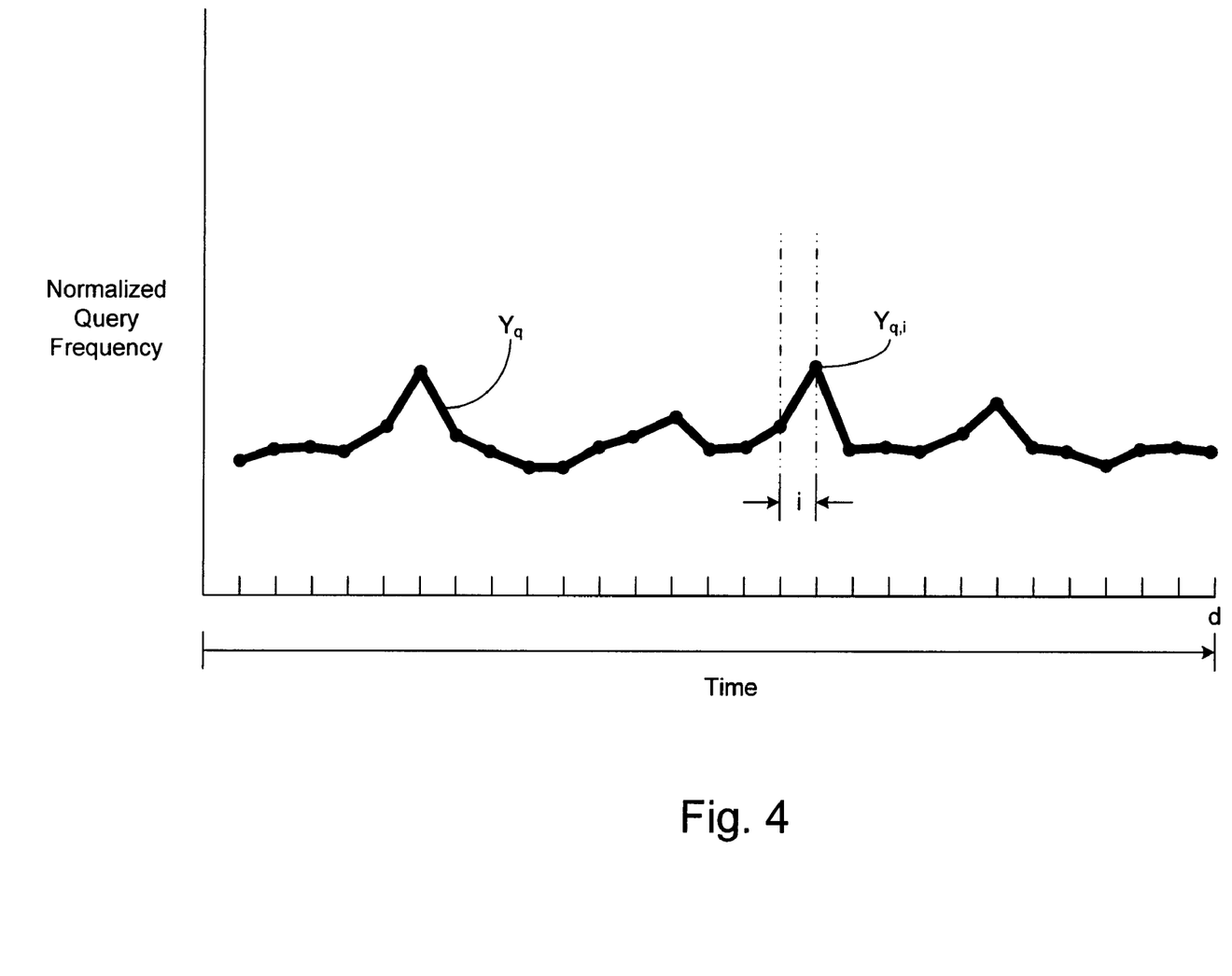
FIG. 4 is a graph of a normalized query data measured over a plurality of discrete time units in a system according to embodiments of the present invention.

FIG. 4 is a normalized query frequency function $Y_q$ of a possible input search query, q, entered for example by the user of device 325. The normalized query frequency is measured over a total number of discrete time units, d. The frequency function of a query q over d time units is the d-dimensional vector $Y_q = (Y_{q,1}, \ldots, Y_{q,d})$. Query q is any query that may be searched using an online search engine, such as for example MSN® Search and as described above. As used herein, an input query, and representations thereof, are generally referred to with the letter "q," and stored queries, and representations thereof, are generally referred to with the letter "p." In accordance with embodiments of the present invention, the frequency $Y_{q,i}$ of a query in a particular time unit may be viewed as a random variable, and the similarity between two queries is given by the correlation coefficient of their frequency functions, as explained hereinafter.

The query frequency at each discrete unit, $Y_{q,i}$, is the normalized frequency of query q during the $i^{th}$ time unit. The frequency $Y_{q,i}$ for query q is normalized as explained above. That is, normalized frequency $Y_{q,i}$ is not simply the number of times query q was searched during the $i^{th}$ time unit. Rather, the normalized frequency $Y_{q,i}$ is given by:

$$Y_{q,i} = \frac{n_{q,i}}{N_i},$$

where $n_{q,i}$ is the number of occurrences of query q during the $i^{th}$ time unit, and $N_i$ is the total number of queries during the $i^{th}$ time unit. As indicated in the Background of the Invention section, query stream volume varies naturally over time. The above definition of query frequency is the density of the query, i.e. how often the query q was entered in comparison to all other queries in a given time period. This normalizes out the effects of the natural variation over time of query stream volume, and prevents some pairs of queries from showing artificially high correlation simply because the total number of queries per time unit is larger during particular periods, i.e., during the day as compared to overnight and during weekdays as compared to weekends. Using the normalized frequency for all queries allows embodiments of the present invention to more accurately compute the true correlation between two queries.

A formal process for calculating a correlation coefficient between an input query q and stored queries p is explained with reference to the flow chart of FIG. 5. In order to determine a correlation between an input query and other queries, representations of normalized query data, measured over a plurality of discrete time units is stored in query database 352. In one embodiment, the normalized query data may be taken for example once a day over a period of a year. However, the individual discrete time units may be seconds, minutes, hours, days, weeks, months or years in various embodiments. The individual discrete time units may be shorter than a second, longer than a year, or any discrete period of time therebetween, in further alternative embodiments. The total number of such discrete time units considered may amount to an hour, a day, a week, a month, a year or a decade in various embodiments. The total number of discrete time units considered may amount to less than an hour, more than a decade, or any period of time therebetween, in further alternative embodiments.

Figure 5:
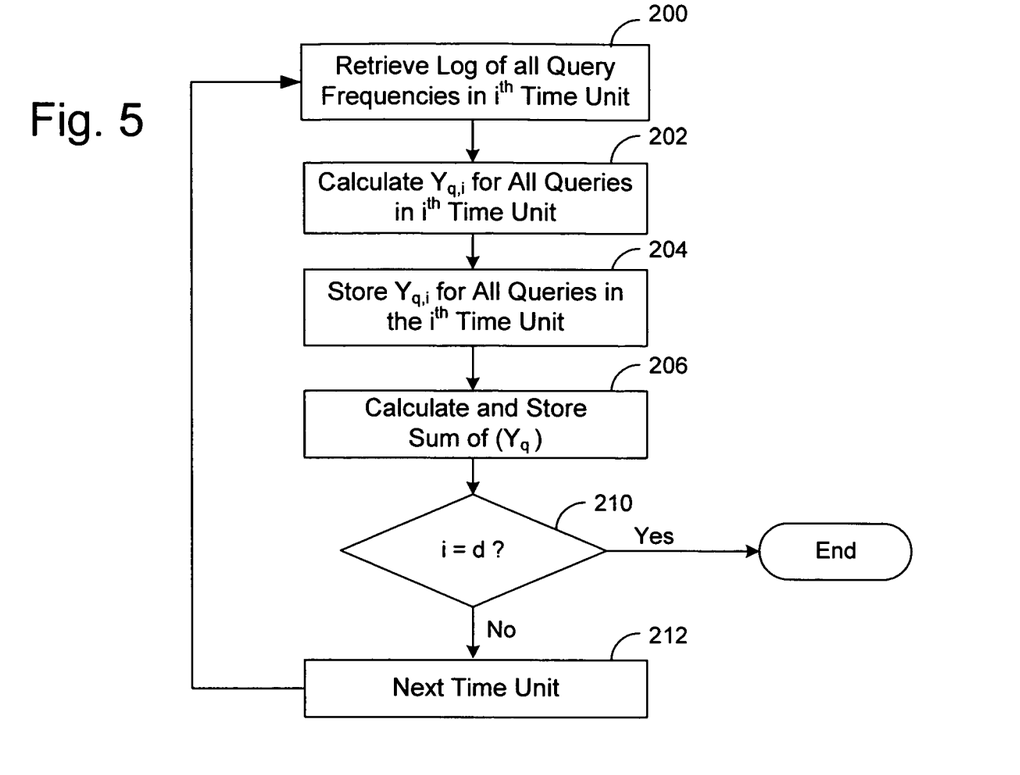
FIG. 5 is a flowchart of a process for generating and storing normalized query frequencies in a system according to embodiments of the present invention.

In one embodiment, shown in the flowchart of FIG. 5, the representations of normalized query data maintained in query database 352 may be generated in real time; that is the entries in the query database may be updated once every discrete time unit (e.g., once a day) for a total number of such discrete time units (e.g., for a year). In such an embodiment, a raw data log of all search queries for a given time unit, i, is retrieved from database 352 in a step 200. This log is typically maintained for all queries received by the search engine 312 some period of time. From this log of search queries for the discrete time unit, i, the density of each query, $Y_{q,i}$, during that time unit is determined by the correlation engine 350 in step 202. As indicated above, the density of each query, $Y_{q,i}$ during a time unit is given by:

$$Y_{q,i} = \frac{n_{q,i}}{N_i},$$

where $n_{q,i}$ is the number of occurrences of query q during the $i^{th}$ time unit, and $N_i$ is the total number of queries during the $i^{th}$ time unit.

In an embodiment of the invention, the density of all queries during a discrete time unit may be stored in database 352 in step 204. As explained hereinafter, the step of storing this data may be omitted in alternative embodiments of the application performing the present invention.

Referring still to FIGS. 4 and 5, a running count of query frequency of all time periods i is calculated and stored in step 206. This value is used to calculate the mean frequency, $\mu(Y_q)$, of the normalized query frequency $Y_q$ for all queries. The mean frequency $\mu(Y_q)$ may be given by:

$$\mu(Y_q) = \frac{1}{d}\sum_{i=1}^{d} Y_{q,i},$$

where i represents each discrete time unit and d represents the total number of time units i to that point.

The running count of query frequencies for all time periods i may also be used to calculate the standard deviation, $\sigma(Y_q)$, of the normalized query frequency $Y_q$ for all queries. The standard deviation $\sigma(Y_q)$ may be given by:

$$\sigma(Y_q) = \sqrt{\frac{\sum_{i=1}^{d}(Y_{q,i} - \mu(Y_q))^2}{d}}.$$

In step 210, if all of the data for the desired number of time units has been collected, then the data collection process ends. Otherwise, the correlation engine 350 awaits passage of the next time unit i in step 212, and the correlation engine returns to step 200 for calculation and storage of data obtained in the next time unit. FIG. 5 describes a real-time gathering of data. It is understood that embodiments may instead use past logs of query frequency stored on database 352 to generate and store the normalized query frequencies for all queries as described above.

Figure 6:
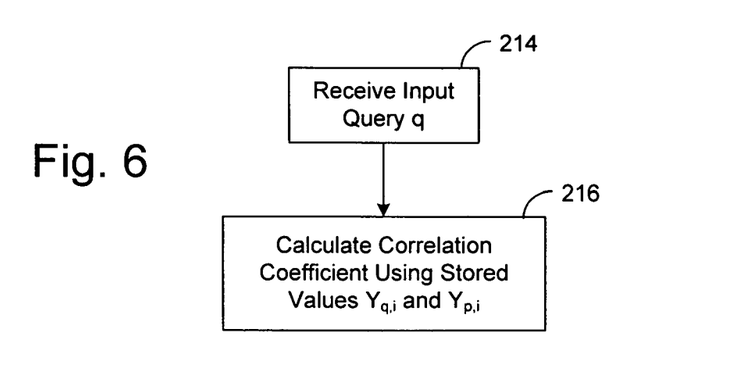
FIG. 6 is a flowchart of a process for calculating correlation coefficients from the normalized query frequency generated and stored in FIG. 4.

With the normalized query frequency data for each query generated and stored for each discrete time unit as shown in FIG. 5, a correlation coefficient, λ, between any two queries, p and q, may be calculated indicating the temporal correlation between the queries p and q. Thus, where a query, q, is input to a search engine in step 214 (FIG. 6), the temporal correlation between that query q and any other stored query p may be calculated in step 216. The correlation coefficient between queries p and q is given by:

$$\lambda_{p,q} = \sum_{i=1}^{d}\left(\frac{Y_{q,i} - \mu(Y_q)}{\sigma(Y_q)}\right)\left(\frac{Y_{p,i} - \mu(Y_p)}{\sigma(Y_p)}\right).$$

The correlation coefficient, λ, ranges between 1 and −1. Highly temporally correlated queries q and p would have high values of λ, with perfectly correlated queries q and p having a correlation coefficient of 1. Inversely correlated queries p and q would have a negative correlation coefficient, and uncorrelated queries p and q would have a correlation coefficient of 0.

As indicated above, using the normalized frequency functions instead of purely frequency of each query normalizes out the effects of the natural variation over time of query stream volume, and prevents some pairs of queries from showing artificially high correlation simply because the total number of queries per time unit is larger during certain time periods. Moreover, measuring the correlation coefficient in the above-described manner uses the correlation of the frequency functions as opposed to the covariance, another common measure of similarity. The covariance fails to normalize for the variance in frequency functions, and thus queries with high variance falsely appear to be temporally related to many other queries.

As set forth in FIGS. 5 and 6, correlation coefficients between any two queries may be computed by correlation engine 350, using the above-described equation together with the stored data for the normalized queries $Y_{q,i}$ and $Y_{p,i}$, and the mean frequency and standard deviation of the frequency for each of $Y_q$ and $Y_p$. However, for a query stream with n queries and d time units, this requires storing dn normalized frequency function values and also requires a linear pass over all of this data each time it is desired to determine the correlation coefficient for an input query.

While this method may be used in embodiments of the invention, an alternative, reduced data model makes use of techniques from the theory of embeddings and nearest neighbor algorithms to allow the processing unit 120 to represent normalized frequency functions for each query with much less data and much less storage space. This alternative method also allows correlation engine 350 to accurately estimate correlation coefficients between an input query and all other queries from this reduced data in less processing time, enabling real time computation of correlation coefficients.

Figure 7:
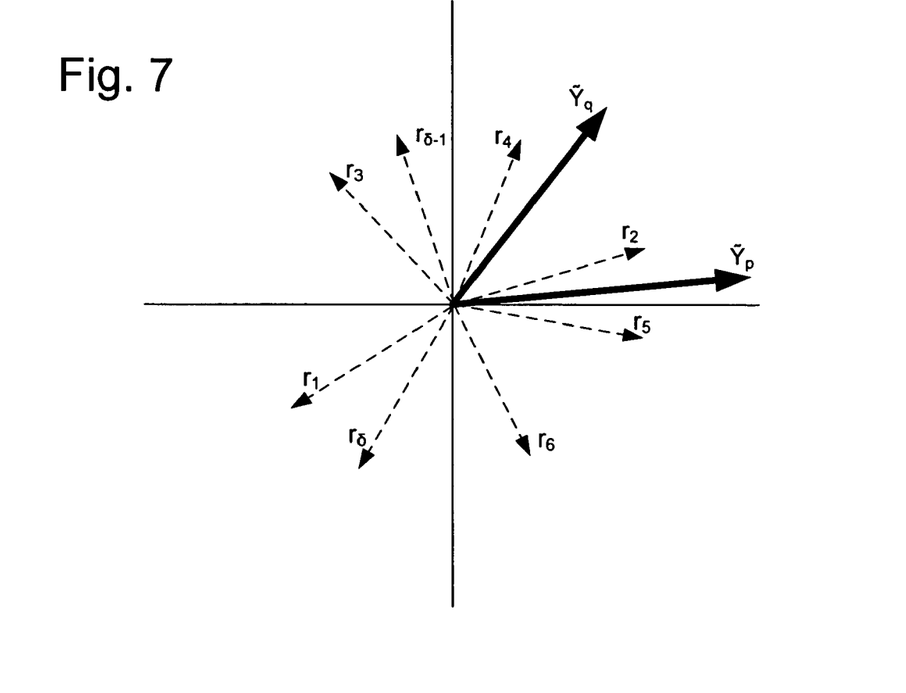
FIG. 7 is a plot of normalized and scaled vectors $\tilde{Y}_q$ and $\tilde{Y}_p$, together with samples of a Gaussian distribution of random vectors $r_i$.
Figure 8:
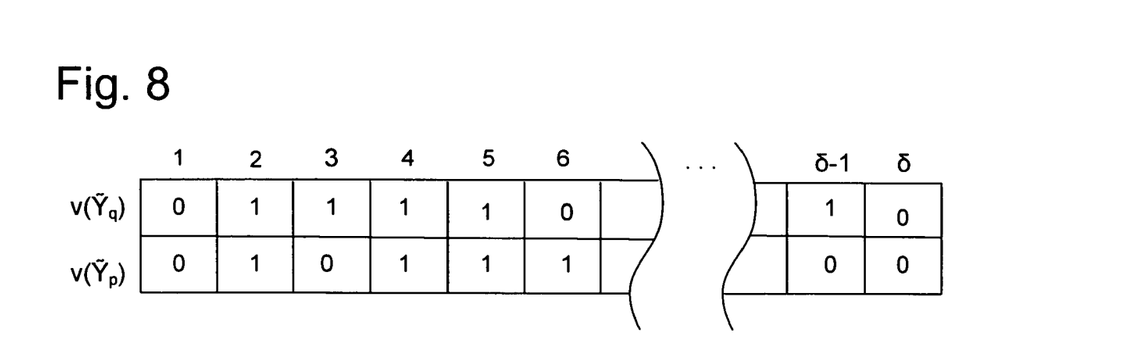
FIG. 8 is a mapping of the normalized and scaled vectors of FIG. 6 into embeddings $v(\tilde{Y}_p)$ and $v(\tilde{Y}_p)$ based on their relation to the random vectors $r_i$.

The method for reducing data in accordance with the present invention is described with reference to FIGS. 7-9. In general, the reduced data model involves representing each query frequency function for all time units as a stored string of, for example, 128 bits. The correlation coefficient between any two query frequency functions is then given by the degree to which corresponding bits in the bit strings representing the two query frequency functions match each other.

A more rigorous mathematical explanation of the reduced data model is set forth below, followed by an explanation of the software implementation within search processing environment 300. The theory of embeddings is additionally described for example in a paper by P. Indyk and R. Motwani, entitled "Approximate nearest neighbors: Towards removing the curse of dimensionality," for the *Thirtieth Annual ACM Symposium on the Theory of Computing*, Dallas, Tex. (1998), and the concept of nearest neighbor algorithms is described for example in a paper by W. Johnson and J. Lindenstrauss, entitled, "Extensions of Lipschitz Maps Into a Hilbert Space," published in *Contemporary Mathematics*, 26:189-206 (1984), both of which papers are incorporated by reference herein in their entirety.

The reduced data embodiment described with reference to FIGS. 7-9 makes use of the fact that a given normalized input query frequency, $Y_{q,i}$, in the $i^{th}$ time unit can be mapped to and described by a scaled and normalized vector $\tilde{Y}_{q,i}$, given by:

$$\tilde{Y}_{q,i} = \frac{1}{\sqrt{n}} \frac{Y_{q,i} - \mu(Y_q)}{\sigma(Y_q)},$$

where n equals the total number of queries in the $i^{th}$ time period. All such vectors $\tilde{Y}_{q,i}$ over all time units, d, define a single query frequency vector $\tilde{Y}_q$ representing the normalized frequency function for query q in Euclidian real space of d-dimensions, $\mathbb{R}^d$. The query frequency vector $\tilde{Y}_q$ is a vector having a first point at the origin, and a second point in d-dimensional real space at $(x_1, x_2, \ldots, x_d)$, where each $x_i$ is determined by each of the scaled and normalized frequency vectors $\tilde{Y}_{q,i}$ for the query q over i time units.

Each of the query frequency vectors may be used to define a mapping, $v(\cdot): \mathbb{R}^d \rightarrow \{0, 1\}^\delta$ that represents each query frequency vector $\tilde{Y}_q$ as a string of $\delta$ bits, $v(\tilde{Y}_q)$. The value selected for $\delta$ depends on the degree of the desired accuracy of the approximation, but not on the original dimension, d. In embodiments, $\delta$ may be between 80 and 160 bits, and may further be 128 bits. It is understood that the value selected for $\delta$ may be lesser than 80 or greater than 160 in alternative embodiments.

The value (1 or 0) for each of the $\delta$ bits in the bit string $v(\tilde{Y}_q)$ is determined using random hyperplanes in a manner similar to that set forth in the paper to P. Indyk and the paper to W. Johnson, previously incorporated by reference, as well as in a paper by M. Goemans and D. Williamson, entitled, "Improved Approximation Algorithms for Maximum Cut and Satisfiability Problems Using Semidefinite Programming," presented in the *Journal of the ACM (JACM)*, 42(6):1115-1145 (1995). In particular, the mapping $v(\cdot)$ is defined by $\delta$ random vectors $\{r_1, r_2 \ldots, r_\delta\} \in \mathbb{R}^d$, which random vectors are interpreted as normal vectors to randomly selected hyperplanes drawn from a Gaussian distribution. For a particular input query, q, the $j^{th}$ bit value of the bit string $v(\tilde{Y}_q)$ is dictated by which side of the $j^{th}$ randomly selected hyperplane the query frequency vector $\tilde{Y}_q$ lies. This is given by the sign of the dot product $\tilde{Y}_q \cdot r_j$. The sign of the dot product will be given by the sign of the cosine of the angle between $\tilde{Y}_q$ and $r_j$. Where the angle between $r_j$ and $\tilde{Y}_q$ is greater than 90° (indicating a negative dot product), the $j^{th}$ bit value of the bit string (also referred to herein as "embedding") $v(\tilde{Y}_q)$ will be 0. Where the angle between $r_j$ and $\tilde{Y}_q$ is less than 90° (indicating a positive dot product), the $j^{th}$ bit value of the embedding $v(\tilde{Y}_q)$ will be 1. The number of hyperplanes generated, $\delta$, is large enough to provide an even distribution of the hyperplanes to yield bit strings $v(\tilde{Y}_q)$ accurately representing each query frequency function.

This concept is explained in greater detail with reference to FIGS. 7 and 8 which show a pair of query frequency vectors $\tilde{Y}_q$ and $\tilde{Y}_p$ representing queries q and p. A first random vector $r_1$ is generated as an orthogonal vector to a randomly generated hyperplane. The dot product $\tilde{Y}_q \cdot r_1$ is a negative value, so the first bit for string $v(\tilde{Y}_q)$ is 0. Similarly, the dot product, $\tilde{Y}_p \cdot r_1$ is a negative value, so the first bit for string $v(\tilde{Y}_p)$ is 0. A second random vector $r_2$ is generated as an orthogonal vector to a second randomly generated hyperplane. The dot product, $\tilde{Y}_q \cdot r_2$ is a positive value, so the second bit for string $v(\tilde{Y}_q)$ is 1. Similarly, the dot product, $\tilde{Y}_p \cdot r_2$ is a positive value, so the second bit for string $v(\tilde{Y}_p)$ is 1. A third random vector $r_3$ is then generated as an orthogonal vector to a third randomly generated hyperplane. The dot product, $\tilde{Y}_q \cdot r_3$ is a positive value, so the third bit for string $v(\tilde{Y}_q)$ is 1. However, the dot product, $\tilde{Y}_p \cdot r_3$ is a negative value, so the third bit for string $v(\tilde{Y}_p)$ is 0. This process of generating random vectors $r_1$ through $r_\delta$ and taking the dot product with the query frequency vectors $\tilde{Y}_q$ and $\tilde{Y}_p$ continues until each of the bits 1 through $\delta$ in strings $v(\tilde{Y}_p)$ and $v(\tilde{Y}_p)$ have been assigned a bit value of 1 or 0.

The correlation coefficient, $\lambda$, between the input query q and any stored query p may be approximated by the number of corresponding bits 1 through $\delta$ between the embeddings $v(\tilde{Y}_q)$ and $v(\tilde{Y}_p)$ that are the same. In particular, the correlation coefficient, $\lambda$, between queries q and p is given by the dot product of the query frequency vectors $\tilde{Y}_q$ and $\tilde{Y}_p$. This is the cosine of the angle between the vectors, or $\cos \theta_{qp}$, measured in radians. Using the embedding method described above, the fraction of corresponding bits which are expected to agree with each other in the bit string is expected to be $1-\theta_{qp}/\pi$. The true correlation coefficient and the approximation of the correlation coefficient given by the fraction of bit agreements $1-\theta_{qp}/\pi$ are not identical to each other, but are sufficiently close to each other in semantically related queries to give an accurate approximation of the correlation coefficient. For example, assume queries having a correlation coefficient, $\lambda$, of 0.9 or higher are of interest:

$\theta_{qp}=\cos^{-1}(0.9)=0.45$ radians.

$1-\theta_{qp}/\pi=0.856$.

Thus, where the fraction of bit agreements between two queries is 0.856 or higher, these queries would have a correlation coefficient of 0.9 or higher, and would be considered semantically related queries in embodiments of the invention.

The greater the fraction of matching corresponding bits, the higher the approximation of the correlation coefficient between queries q and p, and the more temporally correlated are the queries. It can be seen that the dot product sign in embeddings $v(\tilde{Y}_q)$ and $v(\tilde{Y}_p)$ will only disagree where the randomly generated hyperplane falls in between the two query frequency vectors $\tilde{Y}_q$ and $\tilde{Y}_p$. Thus, the smaller the angle between two query frequency vectors $\tilde{Y}_q$ and $\tilde{Y}_p$, the less likely it will be that they are bisected by a random hyperplane, and the higher will be the correlation coefficient for queries q and p.

The reduced data model allows close approximations of correlation coefficients between queries to be accurately determined in an efficient time and space manner. In an embodiment storing the embeddings $v(\tilde{Y}_p)$ as 128 bits, a 16 byte storage location can store each embedding. Thus, the storage of, for example 40,000,000 queries takes up only about 640 Megabytes of storage space.

The software steps for performing the above-described reduced data mathematical operations are described with reference to FIG. 9. In the description of FIG. 9, it is assumed that the raw data log of all search queries over all of the desired discrete time units 1 to d is taken from a previous time period and already exists in database 352. It is understood that the raw data log may alternatively be generated in real time (i.e., the raw data is not previously stored but is recorded in real time after passage of the $i^{th}$ time unit). In either embodiment, as previously indicated, the log of raw frequency data is typically stored and maintained for a predetermined time period in database 352.

Figure 9:
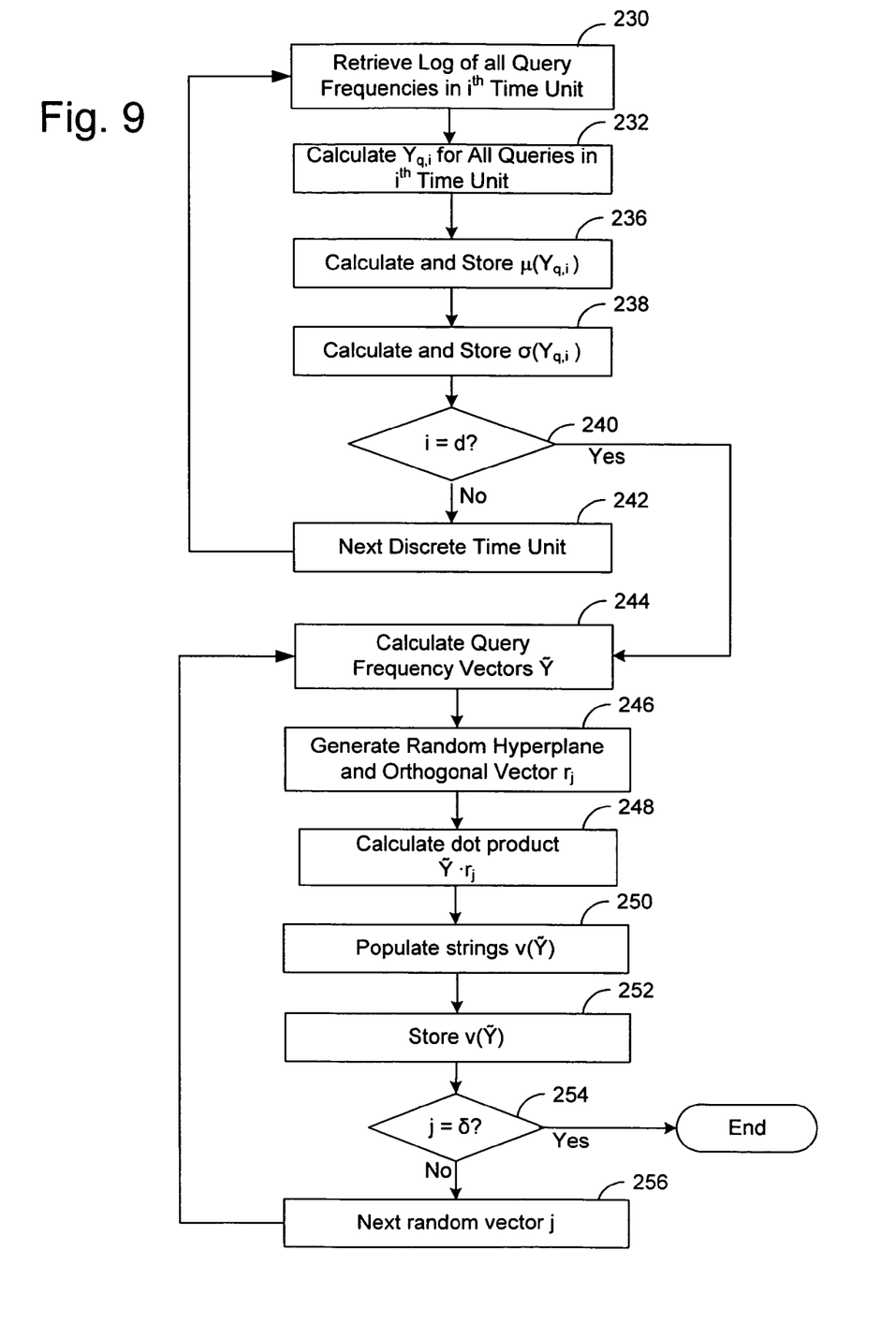
FIG. 9 is a flowchart of the data reduction model for determining correlation coefficients for two queries according to an embodiment of the invention.

In the embodiment described with respect to FIG. 9, a raw data log of all search queries for a given time unit, i, is retrieved in a step 230. From this log of search queries for the discrete time unit, i, the density of each stored query, $Y_{p,i}$, during that time unit is determined by the correlation engine 350 in step 232. As indicated above, the density of each query, $Y_{p,i}$ during a time unit is given by:

$$Y_{p,i} = \frac{n_{p,i}}{N_i},$$

where $n_{p,i}$ is the number of occurrences of query p during the $i^{th}$ time unit, and $N_i$ is the total number of queries during the $i^{th}$ time unit.

A running count of the mean frequency, $\mu(Y_p)$, of the normalized query frequency $Y_p$ for all queries may be calculated and stored in step 236. And a running count of the standard deviation, $\sigma(Y_p)$, of the normalized query frequency $Y_p$ for all queries may also be calculated and stored in step 238.

In an embodiment of the invention, the correlation engine 350 checks in step 240 if there are additional discrete time periods in the total number of time periods d. If there are additional discrete time periods, the time unit is incremented in step 242 and the correlation engine returns to step 230 until all values of $Y_{p,i}$ for i=1 to d have been calculated for all queries. Once all normalized query frequencies $Y_{p,i}$ for discrete time units 1 to d have been calculated for each query, the normalized and scaled query frequency vectors $\tilde{Y}_p$ for each query is calculated in step 244. The normalized query frequencies $Y_{p,i}$ for each discrete time period and for each query need not be stored. However, even where data reduction techniques are applied, the normalized query frequencies $Y_{p,i}$ for each discrete time period and for each query may be stored in alternative embodiments.

A random hyperplane defining random vector $r_j$ is then generated in step 246. This is done by randomly generating each of the components of the vector $r_j$ orthogonal to a given hyperplane. That is, the vector $r_j$ consists of d values chosen randomly from a standard Gaussian distribution with a mean of 0 and a variance of 1. The dot product of each of the query frequency vectors $\tilde{Y}$ with the random vector $r_j$ is calculated in step 248. The correlation engine then assigns a 0 or 1 to the $j^{th}$ bit of each of the strings $v(\tilde{Y}_p)$ in step 250, depending on which side of a particular random vector $r_j$ the query frequency vector $\tilde{Y}$ lies. The updated value of the string $v(\tilde{Y}_p)$ for each query is then stored in step 252. The correlation engine 350 then checks to see if each of the bits 1 through $\delta$ in the strings $v(\tilde{Y}_p)$ has been assigned a bit value in step 254. If so, then the data collection process ends. If not, j is incremented in step 256 and the correlation engine returns to step 246 to continue the bit generation process.

As would be appreciated by those of skill in the art, some of the above-identified steps may be performed in different orders in alternative embodiments. For example, instead of determining the $j^{th}$ bit for all strings $v(\tilde{Y}_p)$, and then incrementing j, each bit in a single string $v(\tilde{Y}_p)$ may be determined, and then the process repeated for all remaining strings $v(\tilde{Y}_p)$.

With all frequency query data stored in accordance with either the embodiments described with reference to FIGS. 5-6, or the data reduction embodiments described with reference to FIGS. 7-9, the correlation coefficient between an entered query q and all stored queries p may be determined. A formal model for next identifying all stored queries having a threshold correlation coefficient with an input query is described with respect to FIG. 10. When a query q is entered in step 260, its corresponding string $v(\tilde{Y}_q)$ may be retrieved from memory in step 262 (in embodiments operating by the data reduction techniques). A linear pass may then be made over all bits $\delta$ in all strings $v(\tilde{Y}_q)$ in step 264 to determine the correlation coefficient, $\lambda$, between the input query and all other stored queries.

Figure 10:
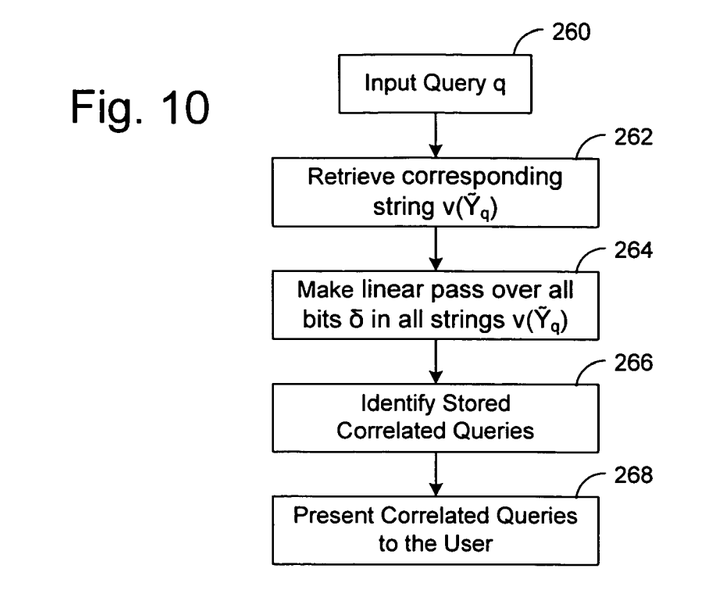
FIG. 10 is a flowchart illustrating a formal process for identifying correlated queries according to an embodiment of the invention.

All queries having a correlation coefficient above a predetermined threshold value with the entered query are identified in step 266. In embodiments of the invention, the threshold value for the correlation coefficient may be 0.80 (translating into agreement of 0.795 of the corresponding bits in the embedding). In further embodiments, the threshold value for the correlation coefficient may be 0.9 (translating into agreement of 0.856 of the corresponding bits in the embedding as described above). Identified queries having correlation coefficients with these values or above with an input query may be considered to have a high temporal and semantic correlation to the entered query. It is understood that the threshold value for the correlation coefficient may be lower than 0.8 or higher than 0.9 in alternative embodiments.

Once one or more correlated search queries to an input query have been identified, these results may be presented to the user in step 268. The presentation of the one or more correlated search queries may be handled differently in alternative embodiments of the invention. In one embodiment, a user may be provided with the option of viewing the one or more search queries which were determined to be semantically correlated to the entered search query. In an alternative, the correlated search queries may be presented to the user unprompted. In a further alternative embodiment, the stored queries having correlation coefficients above the threshold value with the input query may be automatically searched along with the input query, and the results returned along with the search results for the input query. Indications of highly correlated search queries may also be valuable for advertising purposes.

Once an input query has been entered, a linear pass over all bits $\delta$ in all strings $v(\tilde{Y}_p)$ may take excessive time. Therefore, embodiments of the invention employ a scheme for reducing the time it takes to find correlated queries with little or no sacrifice in accuracy. Such a scheme, described with reference to FIG. 11, makes use of the stored strings $v(\tilde{Y}_p)$ for all queries n. In accordance with this scheme, a run time of the algorithm is reduced by limiting the number of queries examined by correlation engine 350 to only those that may have a correlation above the predetermined threshold A. In particular, only those stored queries p having a high correlation to the input query q between the first k bits of embeddings $v(\tilde{Y}_q)$ and $v(\tilde{Y}_p)$ are examined, as those queries p are the most likely to have high correlation with query q.

Figure 11:
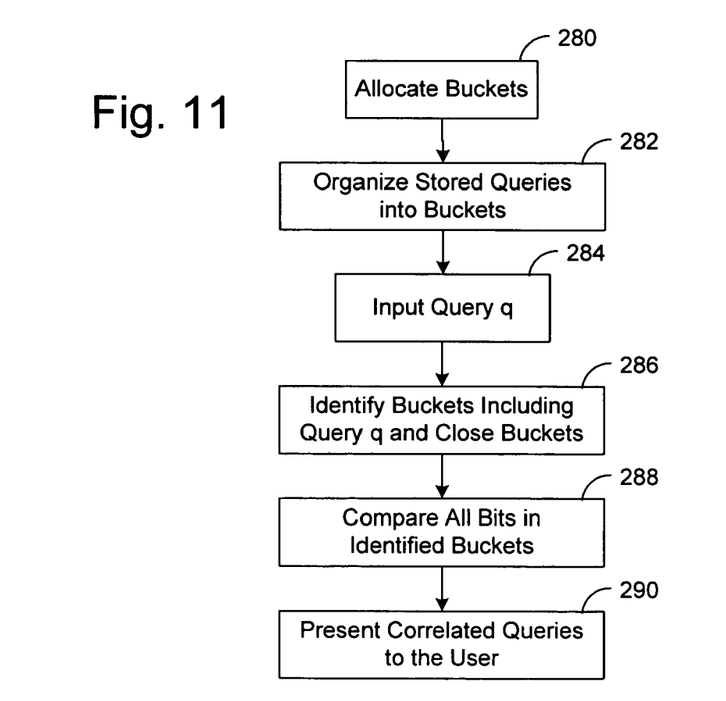
FIG. 11 is a flowchart illustrating a reduced time model for identifying correlated queries according to an embodiment of the invention.

This process is explained in greater detail with reference to FIG. 11. In step 280, $2^k$ buckets (i.e., memory buffers) are allocated. Each of the stored queries p is then organized into the bucket indicated by the first k bits of its embedding $v(\tilde{Y}_p)$ in step 282. That is, all strings having the same first k bits are organized into the same bucket. In embodiments of the invention, k may be between 10 and 30 bits, and further between 15 and 25 bits, and further, may be 20 bits in an embodiment of the invention.

Upon receiving an input query, q, in step 284, the processing unit examines only those embeddings $v(\tilde{Y}_p)$ in the bucket containing q's embedding, $v(\tilde{Y}_q)$ (i.e., all strings within q's bucket), as well as those buckets that are defined as being close to the bucket containing q's embedding, $v(\tilde{Y}_q)$ in step 286. A bucket, b', is defined as being close to the bucket, b, containing query q if some fraction, ρ, of the k bits of bucket b' agree with the corresponding bits in bucket b. In embodiments of the invention, ρ may be less than or equal to the correlation coefficient λ. For a correlation coefficient λ of 0.9, ρ may range between 0.6 and 0.9, or alternatively between 0.7 and 0.8, or alternatively, 0.85, in embodiments of the invention. It is understood that ρ may be less than 0.6, greater than 0.9 and greater than the correlation coefficient λ in alternative embodiments of the invention.

Upon determination of the buckets b and b' in step 286, queries in each of those buckets have all of their bits δ compared to the bit string $v(\tilde{Y}_q)$ in step 288 in embodiments of the invention to eliminate false positives resulting from examination of only the first k bits, and to identify those queries that are in fact at or above the correlation coefficient λ. Once the correlated queries are identified, they may be presented to the user in step 290 as set forth above with respect to FIG. 10.

By only searching through the bucket of query q and close buckets, the number of queries for which bit comparisons are performed is greatly reduced. For example where k=20 and ρ=0.85, for any given bucket, only 1351 of the $2^{20}$=1,048,576 buckets would be examined.

Embodiments of the invention described thus far measure incoming query data for a given time unit. However, owing to different time zones, a query for example from the East coast of the United States would be sent at a different time than a query for example from the West coast of the United States, even though the queries arrived at the location of the search engine at the same time. In alternative embodiments, the time zone of the location of where the query is sent from may be accounted for in calculating the normalized query frequencies, so that, for example, a query sent at 4 pm EST would be included in the same time unit as a query sent at 4 pm PST, even though those queries would arrive at the location of the search engine at different times.

In embodiments described above, the density of each query, $Y_{p,i}$ during the time unit i are stored for all time units. In a further embodiment of the present invention, the above-described methods of the present invention may be carried out without storing the density of each query $Y_{p,i}$ for the time units. In particular, as described above, the sign of the dot product of random vector r and the query frequency vector $\tilde{Y}_q$ is used to determine the embedding $v(\tilde{Y}_q)$ from which the correlation coefficient may be accurately approximated for two queries. However, the sign of the dot product of r and $\tilde{Y}_q$ may be computed without storing past values of query density $Y_{p,i}$. The dot product of r and $\tilde{Y}_q$ is given by:

$$\sum_{i=1}^{d} \frac{(Y_{q,i} - \mu(Y_q))}{\sigma(Y_q)} \times r_i.$$

The value of $\sigma(Y_q)$ does not affect the sign of the dot product, so it is not required to determine the sign of the dot product. Thus, what is needed is the sign of:

$$\sum_{i=1}^{d} (Y_{q,i} - \mu(Y_q)) \times r_i,$$

which is equal to:

$$\sum_{i=1}^{d} Y_{q,i} \times r_i - \mu(Y_q) \times \sum_{i=1}^{d} r_i.$$

Both of the terms $$\sum_{i=1}^{d} Y_{q,i} \times r_i$$

and $$\mu(Y_q) \times \sum_{i=1}^{d} r_i$$

may be calculated without reference to past values of the query density $Y_{p,i}$. The first term may be computed as a new value of $Y_{p,i}$ is received. The second term may be computed by storing only the sum of the $Y_{p,i}$ and the sum of $r_i$ as the time units i pass. Thus, the sign of the dot product of r and $\tilde{Y}_q$ may be computed without storing past values of query density $Y_{p,i}$.

In embodiments described above, stored query densities $Y_{p,i}$ of different time units i are weighted the same in computing normalized and scaled frequency vector $\tilde{Y}_p$. However, in an alternative embodiment, an exponentially decaying function may be applied to query densities $Y_{p,i}$ of older time units so that query densities of more recent time units are weighted more in determining normalized and scaled frequency vector $\tilde{Y}_p$. For example, when updating a frequency vector $\tilde{Y}_p$ with a new query density $Y_{p,i}$ of the current time unit, a multiplier less than 1 (for example 0.5-0.99, and, as another example, 0.9) may be applied to the sum of all past query densities before adding the query density for the present time unit. Thus, query density information from older time periods is weighted less in the frequency vector $\tilde{Y}_p$.

In embodiments described above, semantic relation is determined by temporal correlation, i.e., the relation of the density of two queries in a given time unit. It is understood that criteria other than the density in a given time unit may be used as a basis for determining correlation coefficients and semantic relation between queries. For example, in an alternative embodiment, queries generated by a single user within a population of users may be correlated using the methods according to the present invention described above. This may be completely independent of time. As a further embodiment, queries generated by a single user within a specific time period may be correlated using the methods described above. It is also contemplated that the methods of the present invention may be used to correlate queries based on geographic region, and other criteria, in alternative embodiments.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for determining a semantic relationship between two search engine queries, comprising the steps of:
   (a) receiving a first search engine query;
   (b) identifying a second search engine query stored in memory;
   (c) determining a cumulative density of the first and second search engine queries over a plurality of time periods, wherein the density of each of the two search engine queries during a given time period is the frequency of each of the search engine queries in comparison to the combined number of search engine queries during that time period, the cumulative density for the first and second search engine queries being the density of the first and second search engine queries over all time periods in the plurality of time periods;
   (d) identifying a semantic correlation between the two search engine queries based on the density of the two search engine queries determined in said step (a), wherein identifying a semantic correlation between the two queries comprises the step of representing the data of the two search engine query frequencies by a bit string, and examining a degree to which corresponding bits in the bit strings representing the two search engine query frequencies match each other;
   (e) modifying the second search engine query to include a linking association in memory with the first search engine query in the event it is determined that the semantic correlation identified in said step (d) is above a threshold level; and
   (f) displaying results associated with the second search engine query to the user in the event it is determined that the semantic correlation identified in said step (d) is above a threshold level.

2. The method for determining a semantic relationship between two search engine queries as recited in claim 1, wherein a first query of the two search engine queries is an input query, and a second query of the two search engine queries is a stored query, the method further comprising the step of suggesting the stored query to a user or advertiser where it is determined that a semantic relationship above a threshold level exists between the input query and the stored query.

3. The method for determining a semantic relationship between two search engine queries as recited in claim 1, wherein said step (d) of identifying a semantic correlation between the two queries comprising the step of calculating a dot product of a first vector representing the normalized frequency of the first query and a second vector representing the normalized frequency of the second query.

4. A method for determining a semantic relationship between two search engine queries, comprising the steps of:
   (a) receiving a first search engine query;
   (b) identifying a second search engine query stored in memory;
   (c) obtaining a query density function for each of the first and second search engine queries by resolving the first query into a first bit string and by resolving the second query into a second bit string, wherein the query density function for the first and second search engine queries is based on the frequency of each of the search engine queries in comparison to the combined number of search engine queries during a plurality of time periods;
   (d) identifying a semantic correlation between the two search engine queries based on a degree to which corresponding bits in the first bit string and the second bit string match each other;
   (e) modifying the second search engine query to include a linking association in memory with the first search engine query in the event it is determined that the semantic correlation identified in said step (d) is above a threshold level; and
   (f) displaying results associated with the second search engine query to the user in the event it is determined that the semantic correlation identified in said step (d) is above a threshold level.

5. The method for determining a semantic relationship between two search engine queries as recited in claim 4, said step (c) of obtaining a query density function for each of the first and second search engine queries by resolving the first and second queries into a first bit string and a second bit string comprises the step of representing each of the query density function for the two search engine queries by a 128 bit string.

6. The method for determining a semantic relationship between two search engine queries as recited in claim 4, further comprising the step of calculating a correlation coefficient between the two search engine queries, the correlation coefficient indicating the degree of semantic relationship between the two search engine queries.

7. The method for determining a semantic relationship between two search engine queries as recited in claim 4, where said step (c) obtaining a query density function for each of the first and second queries by resolving the first and second queries into a bit string comprises the steps of generating a plurality of hyperplanes, and generating a bit in the bit string for a first of the two search engine queries, the bit determined by a dot product of a first vector orthogonal to one of the hyperplanes and a second vector representing the first search engine query.

8. The method for determining a semantic relationship between two search engine queries as recited in claim 4, further comprising the steps of: (f) scanning a fraction of the bits of each of the bit strings to identify whether some portion of corresponding bits in the fractions of the first and second bit strings match each other; and (g) scanning the remainder of bits in the bit strings for correspondence if it is determined in said step (f) that some portion of corresponding bits in the fractions of the first and second bit strings match each other.

9. A computer storage medium having computer-executable instructions for performing steps comprising:
   (a) determining t-he a cumulative density of each of a plurality of search engine queries, wherein the plurality of search engine queries include an input query and a plurality of stored queries, and wherein the density of each of the plurality of search engine queries is the frequency of each of the search engine queries in comparison to the combined number of search engine queries during each discrete time period of a plurality of discrete time periods, the cumulative density for each of the search engine queries being the density of each of the search engine queries over all discrete time periods in the plurality of time periods;

(b) representing the query density data determined in said step (a) as respective bit strings, one bit string for each of the plurality of search engine queries;

(c) selecting one or more of the plurality of search engine queries having a correlation coefficient above a first threshold level with respect to a reference search engine the input query of the plurality of search engine queries;

(d) modifying the one or more queries selected in said step (c) to include a linking association in memory with the input; and (e) presenting the search engine queries, having the correlation coefficient above the first threshold level, to a user.

10. The computer storage medium having computer-executable instructions as recited in claim 9, said step (c) of selecting comprising the steps of: (i) scanning a fraction of the bits of each of the bit strings associated with the plurality of search engine queries to identify the one or more search engine queries having some portion of corresponding bits in the fractions of the bit strings match each other, and (ii) scanning the one or more search engine queries to identify the one or more search engine queries having a correlation above the first threshold level to the input query.

11. The computer storage medium having computer-executable instructions as recited in claim 10, wherein said step (i) of scanning a fraction of the bits of each of the bit strings associated with the plurality of search engine queries comprises the step of scanning 20 bits of each of the bit strings.

12. The computer storage medium having computer-executable instructions as recited in claim 9, said step (b) of representing the query data normalized in said step (a) as respective bit strings comprises the steps of generating a plurality of hyperplanes, and generating a bit in the bit string for a first of the plurality of search engine queries, the bit determined by a dot product of a first vector orthogonal to one of the hyperplanes and a second vector representing the input query.

13. The computer storage medium having computer-executable instructions as recited in claim 9, further comprising the step of suggesting the one or more search queries to a user.

14. The computer storage medium having computer-executable instructions as recited in claim 9, further comprising the step of calculating a correlation coefficient between the reference search engine input query and the one or more stored search engine queries, the correlation coefficient indicating the degree of semantic relationship between the ~ input and one or more search engine queries.

* * * * *